United States Patent
Song et al.

(10) Patent No.: US 10,565,771 B2
(45) Date of Patent: Feb. 18, 2020

(54) AUTOMATIC VIDEO SEGMENT SELECTION METHOD AND APPARATUS

(71) Applicant: OATH INC., New York, NY (US)

(72) Inventors: Yale Song, New York, NY (US);
Michael Gygli, Zurich (CH);
Liangliang Cao, New York, NY (US)

(73) Assignee: OATH INC., New York, NY (US)

( * ) Notice: Subject to any disclaimer, the term of this patent is extended or adjusted under 35 U.S.C. 154(b) by 67 days.

(21) Appl. No.: 15/911,106

(22) Filed: Mar. 3, 2018

(65) Prior Publication Data

US 2018/0190002 A1 Jul. 5, 2018

Related U.S. Application Data

(63) Continuation of application No. 15/154,038, filed on May 13, 2016, now Pat. No. 9,911,223.

(51) Int. Cl.
| | |
|---|---|
| *G06T 13/80* | (2011.01) |
| *G06K 9/48* | (2006.01) |
| *G06K 9/00* | (2006.01) |
| *G06K 9/62* | (2006.01) |
| *G06N 3/08* | (2006.01) |

(Continued)

(52) U.S. Cl.
CPC ............ *G06T 13/80* (2013.01); *G06F 16/00* (2019.01); *G06K 9/00744* (2013.01); *G06K 9/00765* (2013.01); *G06K 9/481* (2013.01); *G06K 9/6256* (2013.01); *G06N 3/0454* (2013.01); *G06N 3/088* (2013.01); *G06T 9/00* (2013.01); *G06N 3/08* (2013.01)

(58) Field of Classification Search
CPC ... G06T 13/80; G06T 11/001; G06T 2200/24; G06T 2207/10016; G06T 11/00; G06T 13/00; G06T 7/20; H04N 21/812; H04N 21/8549; H04N 21/44222; G06K 9/00221; G06K 9/46; G06K 9/00718; G06K 9/00744; G06K 9/00751; G06K 9/00765; G06K 9/481; G06K 9/6256; G06N 3/008; G11B 27/031
See application file for complete search history.

(56) References Cited

U.S. PATENT DOCUMENTS

| | | |
|---|---|---|
| 6,904,408 B1 | 6/2005 | McCarthy et al. |
| 2001/0047297 A1 | 11/2001 | Wen |

(Continued)

*Primary Examiner* — Jingge Wu
(74) *Attorney, Agent, or Firm* — James J. DeCarlo; Greenberg Traurig, LLP

(57) ABSTRACT

Disclosed are systems and methods for improving interactions with and between computers in content generating, searching, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatically extracting and creating an animated Graphics Interchange Format (GIF) file from a media file. The disclosed systems and methods identify a number of GIF candidates from a video file, and based on analysis of each candidate's attributes, features and/or qualities, at least one GIF candidate is automatically selected for rendering.

20 Claims, 6 Drawing Sheets

(51) Int. Cl.
*G06T 9/00* (2006.01)
*G06F 16/00* (2019.01)
*G06N 3/04* (2006.01)

(56) References Cited

U.S. PATENT DOCUMENTS

| | | |
|---|---|---|
| 2014/0043363 A1 | 2/2014 | Bala et al. |
| 2014/0219634 A1 | 8/2014 | McIntosh et al. |
| 2015/0117513 A1 | 4/2015 | Sarafa et al. |
| 2015/0121423 A1 | 4/2015 | Phipps et al. |
| 2015/0324096 A1 | 11/2015 | Leblanc et al. |
| 2016/0055663 A1 | 2/2016 | Sandholm et al. |
| 2016/0307599 A1 | 10/2016 | Snell et al. |
| 2016/0323507 A1 | 11/2016 | Chong et al. |
| 2016/0330526 A1 | 11/2016 | Marchetti et al. |
| 2017/0133054 A1 | 5/2017 | Song et al. |
| 2018/0068019 A1* | 3/2018 | Novikoff ............... G06F 16/739 |
| 2019/0005334 A1* | 1/2019 | Grundmann ....... G06K 9/00765 |

\* cited by examiner

AUTOMATIC VIDEO SEGMENT SELECTION METHOD AND APPARATUS

CROSS REFERENCE TO RELATED APPLICATIONS

This application is a continuation of and claims priority from co-pending U.S. patent application Ser. No. 15/154,038, filed May 13, 2016, entitled AUTOMATIC VIDEO SEGMENT SELECTION METHOD AND APPARATUS, the contents of each of which is hereby incorporated by reference.

FIELD OF THE DISCLOSURE

The present disclosure relates to animated video content, and more particularly to an automatic selection of video segments for animated video content.

BACKGROUND

Currently, selection of segments of video content for inclusion in animated video is a painstaking process that is done manually. By way of one example, to generate GIF (Graphics Interchange Format) animated video content, a user must manually select the frames of a given video content item to be included in the animated video content. This approach requires the user to specify timestamps indicating the beginning and the ending of a video clip, from which a single animated GIF is to be generated. The approach requires considerable time and effort on the part of the user. In addition, the approach makes it difficult, or impossible, for novice users to create animated video content. Since the approach requires some expertise on the part of the user, certain users, such as and without limitation novice users, are unable to create content share such content with other users, such as and without limitation on social networking sites. In addition, use of websites, such as and without limitation Tumblr®, which provide access to video content items that can be used to generate animated video and/or provide an ability to present, view, share, etc. video content items and animated video content is reduced.

SUMMARY

The present disclosure provides novel systems and methods for automatic extraction and creation of animated Graphics Interchange Format (GIF) files from a video file. GIFs are efficient at displaying moving images in lieu of actual video files. They are compressed and low bandwidth and require no complex video editing tools.

Presently, GIFs are used in a wide variety of network applications, such as social network sites, blogs, news, and other content distribution services. While becoming more prevalent, the creation of GIFs remains a manual and labor intensive process. The automatic GIF creation described herein enables rapid and automatic GIF development from video content with a high likelihood that the automatically created GIF will attain high visibility when shared in a network. This presents improvements to the quality of, and distribution of, user generated content.

According to some embodiments, the disclosed systems and methods first identifies a number of "GIF candidates" (also referred to as "shots", and understood as segments or portions) of a video file by determining shot boundaries within the video. Such shot boundaries, which delineate the segments of the video file, are associated with transition frames within the video file. For example, such transition frames can include, but are not limited to, a cut between video frames, fade in/out between frames, dissolve or wipe effect(s), and/or any other type of known or to be known effect that transitions between scenes of content within a video file.

The disclosed systems and methods then evaluate each identified GIF candidate in terms of a "GIF quality", which can be quantified by analyzing the GIF candidate's attributes and/or features. As discussed below in more detail, based on the determinations of the GIF candidates' "GIF quality", the disclosed systems and methods can automatically create an animated GIF(s) from a video file that can be rendered.

It will be recognized from the disclosure herein that embodiments of the instant disclosure provide improvements to a number of technology areas, for example those related to systems and processes that handle or process content generation and delivery to users over the internet, such as but not limited to, search engines, local and/or web-based applications, TV widgets, set-top boxes, or other types of media rendering or recommendation platforms, electronic social networking platforms and the like. The disclosed systems and methods can effectuate increased speed and efficiency in the ways that users can access and create new media content, thereby minimizing user effort, as the disclosed systems and methods, inter alia, reduce the amount of required input for a user that is searching for and/or creating media. Users are provided with a fully automated experience through the disclosed systems' and methods' creation and delivery of GIF files generated from media files. For example, the disclosed GIF creation and delivery avoids users having to manually identify specific portions of video files, as the disclosed systems and methods can automatically identify the "GIF-suitable" portions of videos and automatically generate GIF files for such portions, thus improving opportunities for wide distribution and recognition for the GIF associated with the user.

In accordance with one or more embodiments, a method is disclosed which includes receiving, at a computing device, a request from a user for creation of an animated Graphics Interchange Format (GIF) file from a video file; determining, via the computing device, a plurality of segments within a video file for creation of an animated Graphics Interchange Format (GIF) from the video file, the segment determination comprising parsing the video file to identify transition frames within the video file, each segment of the plurality comprising video frames of the video file existing between a pair of identified transition frames; determining, via the computing device and for each segment of the plurality, an n-dimensional feature vector for the segment, the feature vector determination comprising parsing the segment to identify information associated with context and content features of the segment, the feature vector based on the context and content information; determining, via the computing device and for each segment, a GIF suitability score for the segment based on the segment's feature vector, the segment's GIF suitability score being a measure of the segment's suitability for inclusion in the animated GIF file; automatically selecting, via the computing device, a predetermined number of segments of the plurality for inclusion in the animated GIF file based on the GIF suitability score of each segment of the plurality, each selected segment's GIF suitability score indicating that the selected segment is more suitable for inclusion in the animated GIF file than each unselected segment's GIF suitability score; and automatically creating, via the computing device, the animated GIF file, the animated GIF file comprising each selected segment.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically extracting and creating animated GIFs from a video file.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
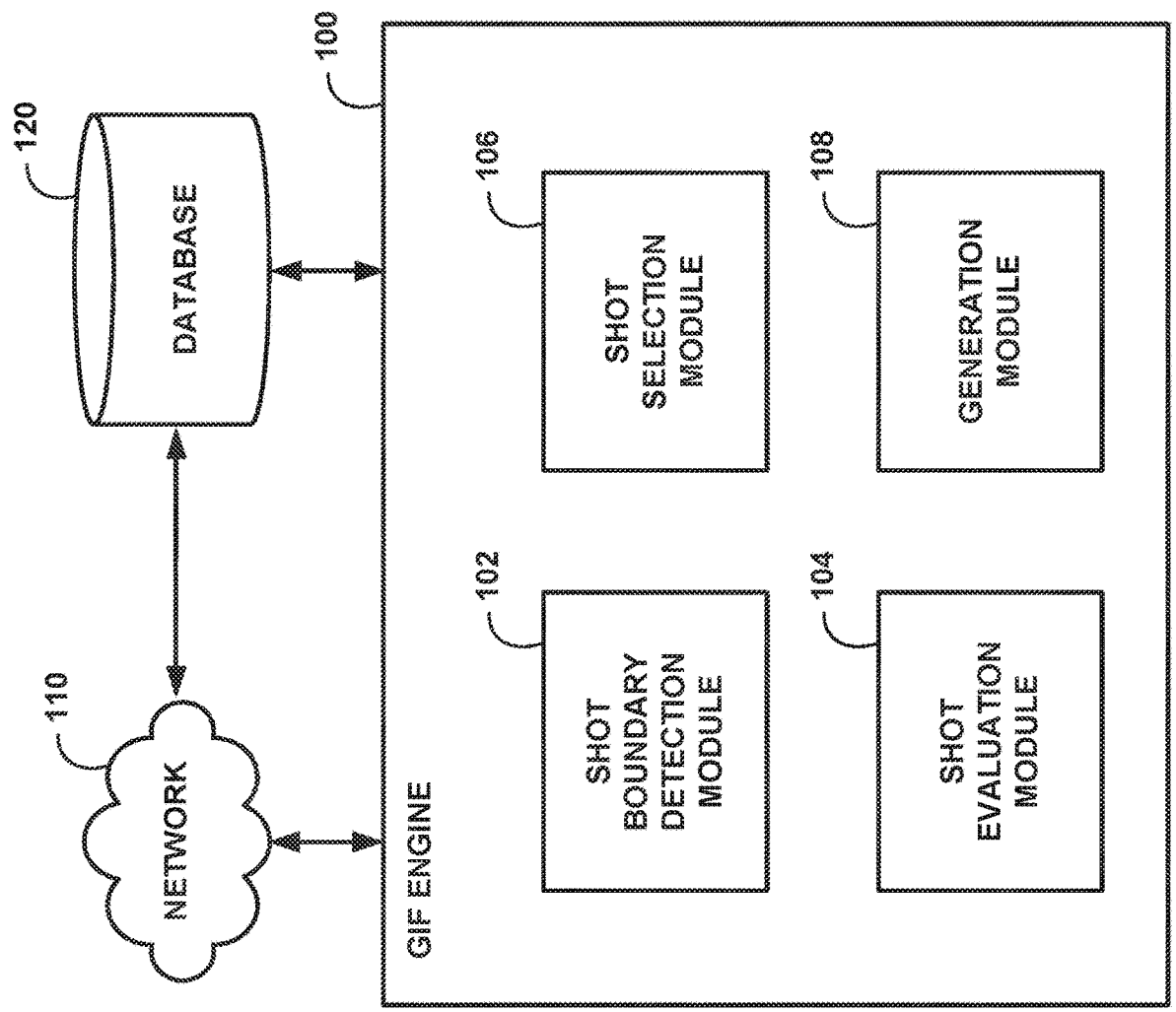
FIG. 1 is a schematic block diagram illustrating components of an exemplary system in accordance with embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, Linkedn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, an animated Graphics Interchange Format file (known as a GIF), is an image file format encoded with multiple image frames. Its intended use case is playing an animation of images continuously in an infinite loop. Up until the early 2000's, animated GIFs have been used primarily for playing simple clipart animations, such as, for example, flames and a waving American flag. However, when social networking sites such as Tumblr® and Reddit™ became popular in the late 2000's, people started using animated GIFs in a more creative way. Most notably, people started leveraging the large amount of online videos to create animated GIFs, generating numerous famous Internet memes and Cinemagraphs. As a result, use of GIFs has increased dramatically extending across all social networking platforms and even having a place in fashion advertising.

With the widespread popularity of animated GIFs, there is currently a huge demand for easy-to-use tools that generate animated GIFs from videos. However, existing systems are cumbersome to use because they require users to manually specify two timestamps, the beginning and the end of a video clip, from which a single animated GIF is generated. Such conventional input can be performed either through a command line interface (CLI) or a graphical user interface (GUI). This requires a user to manually specify the exact time range which makes existing systems difficult to use and requires extensive human effort and experience.

For example, conventional systems require editors to manually extract individual animated GIFs from videos and share them on social media. Tumblr®, for example, has an estimated 1.5 billion content videos across its sites. The conventional approach to GIF creation becomes quickly impractical when dealing with such figures, and there currently exists no alternative solution as manual generation is the only option the editors have today.

As such, the instant disclosure provides a novel solution addressing the immediate demand for an automated system, application and/or platform that generates animated GIFs from videos. The present disclosure provides novel systems and methods for automatic extraction and creation of animated GIF files from video files. According to some embodiments, the disclosed systems and methods first identifies a segment(s) of a video file, interchangeably referred to as a "GIF candidate" or shot. A segment of a video file is a portion of the video file, not the entire video. Identification of the GIF segment(s) is based on a determination of shot boundaries within the video. Shot boundaries, which delineate the beginning and end of a segment of the video file, are associated with transition frames within the video file that provide an indication between differing scenes of the video's content. Such transition frames can include, but are not limited to, a cut between video frames, fade in/out between frames, dissolve or wipe effect(s), and/or any other type of known or to be known visual effect that indicates a transition between types content of a video file.

The disclosed systems and methods then evaluate each identified GIF candidate in terms of a "GIF quality", which can be quantified by analyzing the GIF candidate's attributes and/or features. As discussed below in more detail, based on the determinations of the GIF candidates' "GIF quality", the disclosed systems and methods can automatically create an animated GIF(s) from a video file that can be rendered. In some embodiments, a selection may also occur whereby the GIF candidate having the highest "GIF quality" can be selected for presentation to a user. In some embodiments, only those GIF candidates having a "GIF quality" satisfying a threshold can be presented to a user, whereby these candidates can then be selected by a user for rendering and/or sharing.

The benefits of the disclosed systems and methods can be evidenced two-fold: 1) the disclosed systems and methods provide a technologically based mechanism for automatic extraction of animated GIFs from video files; and (2) the proposed systems and methods are based on techniques that are specifically designed to evaluate the "GIF quality" of animated GIF candidates, for example, in terms of their suitability as an animated GIF, which has never been explored before. Thus, the disclosed systems and methods, for example, extract GIFs from videos in a fully automated manner that is predicated on a determination of the "quality" of the GIF.

The disclosed systems and methods can be implemented for any type of content item, including, but not limited to, video, audio, images, text, and/or any other type of multimedia content. While the discussion herein will focus on video content items, it should not be construed as limiting, as any type of content or multimedia content, whether known or to be known, can be utilized without departing from the scope of the instant disclosure. Digital video content can comprise a number of frames, each of which comprises a number of pixels represented as binary data. Each frame within the digital video content can be uniquely identified by a corresponding frame index, or serial number.

Certain embodiments will now be described in greater detail with reference to the figures. FIG. 1 is a block diagram illustrating the components for performing the systems and methods discussed herein. FIG. 1 includes a GIF engine 100, network 110 and database 120. The GIF engine 100 can be a special purpose machine or processor and could be hosted by an application server, content server, social networking server, web server, search server, content provider, email service provider, ad server, user's computing device, and the like, or any combination thereof.

According to some embodiments, GIF engine 100 can be embodied as a stand-alone application that executes on a user device. In some embodiments, the GIF engine 100 can function as an application installed on the user's device, and in some embodiments, such application can be a web-based application accessed by the user device over a network. In some embodiments, the GIF engine 100 can be installed as an augmenting script, program or application to another media application (e.g., Yahoo!® Video, YouTube®, Hulu®, and the like).

The database 120 can be any type of database or memory, and can be associated with a content server on a network (such as and without limitation a content server, search server, application server, etc.,) or a user's device. Database 120 comprises a dataset of data and metadata associated with local and/or network information related to users, services, applications, content (e.g., video) and the like. Such information can be stored and indexed in the database 120 independently and/or as a linked or associated dataset. It should be understood that the data (and metadata) in the database 120 can be any type of information and type, whether known or to be known, without departing from the scope of the present disclosure.

According to some embodiments, database 120 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes creating, recommending, rendering and/or delivering GIFs or videos, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 120 can be any type of information related to a user, content, a device, an application, a service provider, a content provider, whether known or to be known, without departing from the scope of the present disclosure.

According to some embodiments, database 120 can store data and metadata associated with video content from an assortment of media providers. For example, the information can be related to, but not limited to, content type of the video, a category associated with the video, information associated with the pixels and frames of the videos, and any other type of known or to be known attribute or feature associated with a video file. Additionally, the video information in database 120 for each video can comprise, but is not limited to, attributes including, but not limited to, title, description, tags, and the like. Such information can be derived from information provided by the user, a service provider (i.e., Yahoo!® or Tumblr®), by the content/service providers providing video content (e.g., Netflix®, Hulu®, YouTube®), or by other third party services (e.g., rottentomatoes.com, IMDB™, Facebook®, Twitter® and the like), or some combination thereof.

According to some embodiments, such video information can be represented as an n-dimensional vector (or feature vector) for each video, where the information associated with the video can be translated as a node on the n-dimensional vector. Database 120 can store and index video information in database 120 as a linked set of video data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology.

While the discussion below will involve vector analysis of video information, as discussed above, the video information can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

For purposes of the present disclosure, as discussed above, videos (which are stored and located in database 120) as a whole are discussed within some embodiments; however, it should not be construed to limit the applications of the systems and methods discussed herein. That is, while reference is made throughout the instant disclosure to videos (e.g., video clips, movies, music videos, TV shows, YouTube® videos, Instagram® videos, Vine™ videos, and/or any other type of streaming or downloadable video content), other forms of user generated content and associated information, including for example text, audio, multimedia, RSS feed information can be used without departing from the scope of the instant application, which can thereby be communicated and/or accessed and processed by the GIF engine 100 according to the systems and methods discussed herein.

The network 110 can be any type of network such as, but not limited to, a wireless network, a local area network (LAN), wide area network (WAN), the Internet, or a combination thereof. The network 110 facilitates connectivity of the GIF engine 100, and the database of stored resources 120. Indeed, as illustrated in FIG. 1, the GIF engine 100 and database 120 can be directly connected by any known or to be known method of connecting and/or enabling communication between such devices and resources.

The principal processor, server, or combination of devices that comprises hardware programmed in accordance with the special purpose functions herein is referred to for convenience as GIF engine 100, and includes shot boundary detection module 102, shot evaluation module 104, shot selection module 106, and generation module 108. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 2.

As discussed in more detail below, the information processed by the GIF engine 100 can be supplied to the database 120 in order to ensure that the information housed in the database 120 is up-to-date as the disclosed systems and methods leverage real-time information and/or behavior associated with the video file, user and/or the user's device during or responsive to GIF creation, selection and rendering, as discussed in more detail below.

Figure 2:
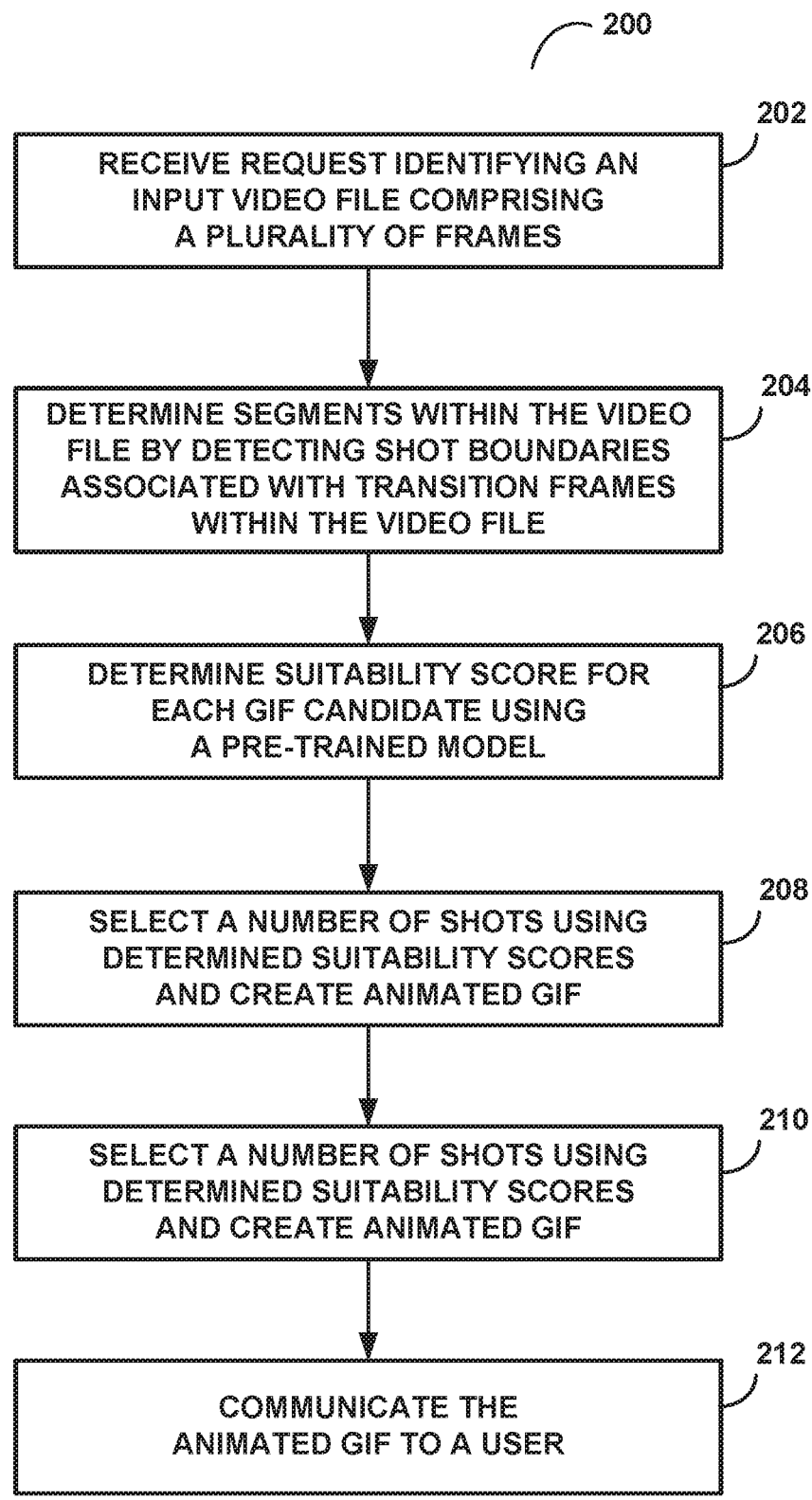
FIG. 2 is a flowchart illustrating steps performed in accordance with some embodiments of the present disclosure.

FIG. 2 provides a process flow overview in accordance with one or more embodiments of the present disclosure. Process 200 of FIG. 2 details steps performed in accordance with exemplary embodiments of the present disclosure for automatically extracting and creating an animated Graphics Interchange Format (GIF) file from a video file. According to some embodiments, as discussed herein with relation to FIG. 2, the process involves automatically extracting content from a video file in order to create a GIF file from the extracted content. Such extraction and creation involves, detecting boundaries between shots of a video; and extracting context and shot level features, in order to determine the suitability of each shot and to use the determined suitability of each shot to rank the shots based on suitability score and to select a number, n, of the shots determined to be most suitable for an animated GIF, as discussed in more detail below.

At Step 202, a request is received by GIF engine 100. The request identifies an input video file comprising a plurality of frames. The request may be a user's request to view or preview the video file, a request from the user to generate a GIF from the video file, among other known or to be known processes that involve identification of a video file for presentation of at least a portion of the video file to the user.

At Step 204, which is performed by shot boundary detection module 102, the input video file is analyzed to detect a number of shot boundaries between shots. The detected shot boundaries can be used to identify at least one GIF candidate from within the video file. In other words, Step 204 identifies boundaries between shots in a video file, where a shot is a set of frames that are temporally adjacent in the vide file and visually coherent. As discussed herein, a GIF candidate, also referred to interchangeably herein as a shot, is a segment of the vide file that is delineated by a beginning shot boundary and an ending shot boundary. According to some embodiments, shot boundaries are transition frames within the video file, and include, but are not limited to, a cut between video frames, fade in/out between frames, dissolve or wipe effect(s), and/or any other type of known or to be known effect that transitions between scenes of a video file.

According to some embodiments, Step 204 involves analyzing the video file to determine each transition frame. Such analysis can include parsing the video file and analyzing each frame (or pixel of each frame) to identify discontinuities between adjacent frames. In some embodiments, the shot boundary detection occurring in Step 204 involves implementing any known or to be known media frame algorithm or scheme technique for determining differences between adjacent frames, such as, frame differencing and a multiple change point detection (MCPD) algorithm. As understood by those of skill in the art, such algorithms and techniques compute the sum of pixel-wise differences from each pair of frames over time, and then determine the boundaries by thresholding the difference value with an empirically found value.

In some embodiments, applications of the frame differencing technique focus on identifying transition frames that comprise "easy-to-detect" transitions, such as, cut, wipe and the like. In order to identify the more subtle boundaries, such as for example, fade in/out, or dissolve, the analysis of each frame is refined by applying the MCPD algorithm. Therefore, according to some embodiments, Step 204 involves the application of the frame differencing algorithm, then an application of the MCPD algorithm in order to refine the results from the frame differencing.

Thus, Step 204 involves analyzing the video file obtained from Step 202 via the shot boundary detection module 102 applying a frame differencing technique in order to identify the presence of transitions in the frames of the video file. The result of the frame differencing technique includes identification of the transition frames associated with cut, wipe, and similarly basic visual effects. This, therefore, provides an initial result of the segments (or shots) within the video file. Next, for each segment (or shot) that is longer than a predetermined length, the MCPD algorithm is applied. This application occurs because, as noted above, frame differencing cannot identify the more subtle transition effects of a video due to its efficient techniques of analyzing media; therefore, the shot boundary detection module 102 implements a more complex algorithm (i.e., MCPD) to identify transitions (e.g., dissolve and wipe) within the segments/shots that are longer than a predetermined length (e.g., 10 seconds), as such subtle transitions may have went undetected during the initial frame differencing analysis. In some embodiments, if there are no shots longer than the predetermined length, the analysis stops as all transition frames are understood to be located.

Therefore, according to some embodiments, the shot boundary detection module 102 applies a "divide-and-conquer" approach to its analysis of the video file by "dividing" (or parsing) the video file in to segments using an efficient algorithm (e.g., frame differencing), then "conquering" each small piece using a comprehensive algorithm (e.g., MCPD algorithm). As a result of step 204, shot boundaries within a video file are detected, which are represented as time indices within the video file, and as a result, reference to each shot (or segment or GIF candidate) can be made from sequential shot boundary pairs.

In some embodiments, Step 204 may involve applying the frame differencing and MCPD algorithms at the same time; or, may involve only applying the MCPD algorithm. In some embodiments, Step 204 may involve applying any known or to be known algorithm that can identify all types of known or to be known transitions within a media file thereby avoiding the two-step process of Step 204 discussed above.

Figure 3:
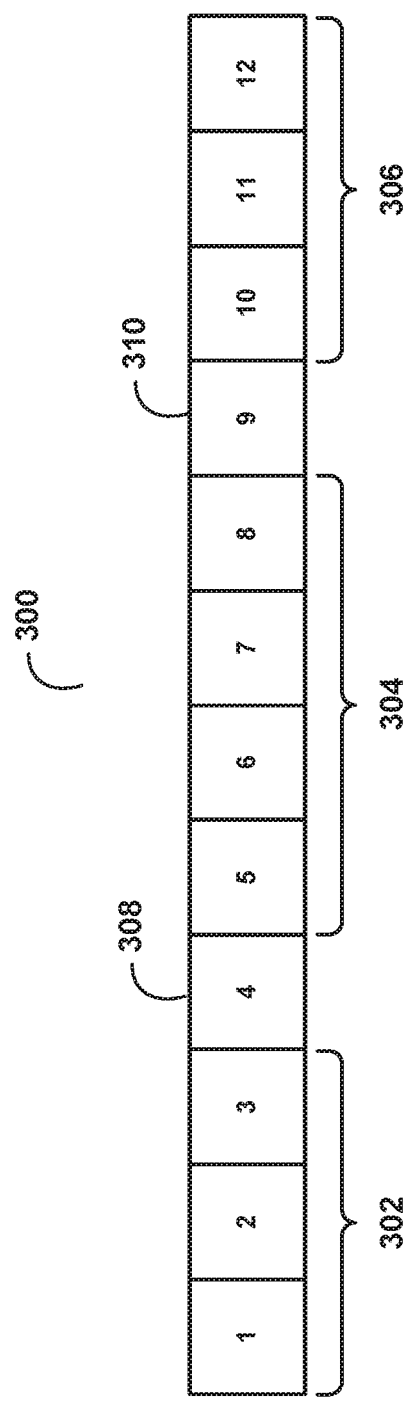
FIG. 3 is a diagram of an exemplary example of a non-limiting embodiment in accordance with some embodiments of the present disclosure.

By way of a non-limiting example, FIG. 3 illustrates the discussion above respective to Steps 202-204. FIG. 3 illustrates a video file 300 that is obtained (Step 202), whereby, for example, the video 300 has image frames 1-12. The video, for example, includes content showing a reporter speaking in front of a court house (frames 1-3), then the content transitions (frame 4) to a clip of a couple getting married (frames 5-8), then finally transitions (frame 9) back to the reporter (frames 10-12). The shot boundary detection of Step 204 involves analyzing the frames of the video to not only identify when the transitions occur (frames 4 and 9), but also to identify each segment of the video bookended by the transitions. The two transitions that are identified correspond to the video cutting from the reporter (frame 4, item 308 which represents the image frame where the transition effect occurs), then cutting back to the reporter (frame 9, item 310 which represents the image frame where the transition effect occurs). Thus, there are three shots (or segments) in the video delineated by the two identified transitions: 1) the first shot of the reporter (frames 1-3, item 302); 2) the clip of the wedding (frames 5-8, item 304); and 3) the second shot of the reporter (frames 10-12, item 306). In some embodiments, the true beginning and end of the video file can be viewed as transitions that indicate the beginning and end of the video file; therefore, there can actually be 4 transitions, where the beginning of the video file and the first transition bookend the first shot of the reporter and the second transition and the end of the video file bookend the second shot of the reporter. In some embodiments, the transition frames may also be included in an identified shot, either the beginning transition frame, ending transition frame, or some combination thereof. Thus, in the example of FIG. 3, there are 3 shots (items 302-306), and each shot is then analyzed and at least one shot (items 302-306) can be converted to an animated GIF.

Referring again to FIG. 2, Step 206 involves analyzing each GIF candidate identified from Step 204 and determining its suitability for inclusion in an animated GIF. Step 206 is performed by the shot evaluation module 104. Step 206's suitability determination is associated with a determination of a GIF candidate's suitability for inclusion in an animated GIF. As discussed herein, a GIF candidate's suitability is based on the GIF candidate's features, which include global (used interchangeably herein with contextual) features and shot-level (used interchangeably herein with video content) features.

Step 206's GIF candidate (or shot) evaluation involves three parts: 1) feature extraction, 2) feature fusion, and 3) suitability score estimation. Turning to Part 1 of step 206, which involves performing feature extraction in order to extract two types of features from the shot: 1) contextual features and 2) shot-level, or content, features.

Contextual features complement the visual content features. Contextual features can be used to disambiguate segment rankings and allow the pre-trained model to score segments conditioned on both the video content and contextual information associated with the video content. Contextual features can include features that are based on information from metadata associated with video file as a whole or with a segment of the video file, such as and without limitation a title, description, video tags, video category (such categories as without limitation, entertainment, music, gaming, sports, news, health, beauty, and the like), content provider (such as and without limitation the entity that uploaded the video file to the web), user commentary, positional features, etc. Textual information can be transformed into a contextual feature vector representation using any known or to be known method. By way of some non-limiting examples, a category label can be represented using an one-hot vector representation. With respect to metadata information such as and without limitation tags, title, description, user commentary, and the like, word embedding natural language processing can be used to maps words or phrases from a vocabulary of words to vectors in a two-dimensional space covering the vocabulary. In the two-dimensional space, words or phrases having similar meaning are closer together, and words or phrases that have dissimilar meaning are farther apart. One example of a word-embedding natural language processing technique which can be used to generate a vector representation of a metadata's items semantic meaning is word2vec. Contextual information may be associated with the video file as a whole, or to a segment of the video file. In a case that contextual information is associated with a particular segment of the video file, a "positional feature" associated with the contextual information can include additional information, such as and without limitation a time stamp, rank and relative position of the segment in the video file.

An animated GIF contains highly dynamic visual content. In other words, the visual content can change from one GIF candidate to the next. As such, Part 1 of Step 206 performs feature extraction of content-type features, or visual content feature extraction, at the shot level. The content feature representation captures both spatial and the temporal dynamics of video segments of the video file. Any known or to be known method may be used to extract visual content features. In at least one embodiment, a three-dimensional convolution learning is used to preserve temporal information. A video segment input to such a three-dimensional convolution yields both spatial and temporal feature output.

By way of a non-limiting example, a three-dimensional convolutional network trained for action recognition in videos, such as and without limitation the C3D neural network, can be used to extract visual content features.

Turning to Part 2 of Step 206, the shot evaluation module 104 combines the two types of features (i.e., contextual and visual content, discussed above) by concatenating them into a single feature vector. It should be understood by those of skill in the art that any type of known or to be known principal component analysis and canonical correlation analysis or vector analysis can be applied herein without departing from the scope of the instant disclosure. For example, the two features can be translated into a single feature vector via a vector analysis algorithm or technique, as well as any known or to be known computational analysis technique or algorithm, such as, but not limited to, cluster analysis, data mining, Bayesian network analysis, Hidden Markov models, artificial neural network analysis, logical model and/or tree analysis, and the like. The output of Part 2 of Step 206 is a single feature vector (referred to as the fusion feature vector) that has a dimension that can be fixed across shots with different lengths.

Part 3 of Step 206 involves determining (or determining a probability or estimating) a shot's suitability for use in an animated GIF. A shot's suitability is determined using a pre-trained ranking model that determines a segment's GIF-suitability score using the segment's fusion feature vector. In Part 3 of Step 206, the shot evaluation module 104 estimate's the GIF suitability of each segment identified at Step 204 of the video file identified in Step 102 by applying a regression function F to the segment's fusion feature vector X and a weighted (optimal) parameter W and returning a real valued output score y: $F(X,W)=y$. The weighted parameter W is based on a trained ranking model. The trained ranking model is used to generate a GIF-suitability score y for each segment of the video file identified in Step 102, such that a ranked listing of the video file's segments ordered based on their respective GIF-suitability scores can be used in Step 208 to select a number of segments to create an animated GIF.

The ranking model is trained using a training dataset comprising a number of known animated GIFs and each animated GIF's corresponding video file, i.e., the corresponding video file being the one whose segment(s) were used to generate the known animated GIF. The animated GIFs can be GIFs created online by users using tools provided by websites such as ezGIF, makeaGIF, GIFsoup, GIFyoutube, Google Photos, etc., which allow the user to select a snippet of a video and transforms the user-selected snippet into a GIF. Each animated GIF is aligned to its source video, so that shots from each video can be assigned either a "GIF segment" (or positive) label or a "non-GIF segment" (or negative) label. That is, given a video and an animated GIF generated from the video, each shot from the video used in the animated GIF is assigned a "GIF segment" (or positive) label and each shot from the video that is not used in the animated GIF is assigned a "non-GIF segment" (or negative) label. As such, a supervised learning approach can be used in training the regression ranking function.

A GIF's frames can be aligned with frames from its corresponding video using frame matching. Each GIF frame and video frame can be encoded with a perceptual hash based on a discrete cosine transform. The perceptual hash of a GIF frame can be matched to a video frame using a Hamming distance, which can be computing using each frame's perceptual hash, each of which is a binary representation of its corresponding frame. Frames may be considered to match if the Hamming distance is within a given threshold distance. Since a GIF, typically, is short in length and has a low frame-rate, it typically contains only a few frames (e.g., less than 50 frames), this approach is computationally efficient and provides for an accurate alignment.

For each video file in the training data set, contextual and visual content features of each segment of the video file are extracted in the same manner described above, and the contextual and visual content feature vectors are combined to form a single feature vector, or fusion feature vector for the segment. In addition to the fusion feature vector, each segment has a corresponding label indicating whether or not the segment is a positive or negative segment. The model training uses a video-specific approach to formulating the ranking function designed to score a positive segment (or "GIF segment") from a given video higher than a negative (or "non-GIF segment") from the same video. A positive segment is a segment included in a GIF and a negative segment is a segment excluded from the GIF. A comparison of two segments is meaningful where the two segments are from the same video, since an animated GIF is generated from a single video and one video's segments are very likely to differ (in level of interest, quality, etc.) from another video's segments. Thus, a comparison of positive and negative segments from the same video is likely to be more meaningful than a comparison of positive and negative GIF segments each from different videos.

In embodiments, the training data is used to estimate the optimal model parameter vector, W, by solving:

$$W = \operatorname{argmin}_{\{W\}} \Sigma_{\{i\}} \operatorname{loss}(F(s_i^+, W), F(s_i^-, W)), \quad \text{Expression (1)}$$

where $\operatorname{loss}(F(s_i^+, W), F(s_i^-, W))$ measures an error in ranking a training pair (a positive segment $s^+$ used in a GIF and a negative segment $s^-$ not used in the GIF) of segments from a given video, such that it penalizes ranking the positive segment too low, e.g., below a given margin, compared to the negative segment. By minimizing the expected loss over the training dataset, the optimal solution W is determined, which best estimates the suitability of segments of a video file for inclusion in an animated GIF.

The loss function, which is used in determining an optimal solution W, is used to control ranking of segment pairs used from the training data, each segment pair including a positive segment, $s^+$, and a negative segment, $s^-$, of a same, or single, video. The loss function as a constraint on the training and imposes a penalty if the positive segment, $s^+$, is ranked lower than, or above but within a certain margin of, the negative segment, $s^-$. One example of a loss function, $l_p$, can be expressed as follows:

$$l_p(s^+, s^-) = \max(0, 1 - h(s^+) + h(s^-))^p, \quad \text{Expression (2)}$$

where p may be set to a value such as and without limitation 1 or 2, $h(s^+)$ is the positive segment's rank generated by a ranking function and $h(s^-)$ is the negative segment's rank generated by the ranking function. The $l_p$ loss implements the desired ranking of a positive segment higher than a negative segment by a certain margin. In the example given above, the margin is one. If the margin is violated, the incurred loss (used herein interchangeably with penalty) is linear in the error (e.g., for an l1 loss where p is set to a value of 1), while for the l2 loss, the incurred loss is quadratic (e.g., where p is set to a value of 2). In the above loss function, an l1 loss (where p is set to 1) over-penalizes small margin violations more significantly than an l2 loss (where p is set to 2), and the l2 loss quadratically penalizes margin violations, and is therefore more affected by outliers than the l1 loss.

A more robust rank loss function used in connection with embodiments of the present disclosure is a novel Huber loss formulation. With the novel Huber loss function, the type of loss incurred is determined based on the violation. The novel Huber loss function used in embodiments of the present disclosure can be represented as follows:

$$l_{Huber}(s^+, s^-) = \begin{cases} \frac{1}{2} l_2(s^+, s^-), & \text{if } u \leq \delta \\ \delta l_1(s^+, s^-) - \frac{1}{2}\delta^2, & \text{otherwise} \end{cases}, \quad \text{Expression (3)}$$

where $u = 1 - h(s^+) + h(s^-)$ from Expression (2) and $\delta$ represents a point, or value of u, at which the incurred loss, $l_{Huber}(s^+, s^-)$, becomes linear. In the above expression, $l_2(s^+, s^-)$ corresponds to Expression (1) where p is equal to 2 (which imposes a quadratic loss by squaring u) and $l_1(s^+, s^-)$ corresponds to Expression (2) where p is equal to 1 (which imposes a linear loss using u). In other words and with reference to Expressions (1) and (2), if the positive segment, $s^+$, is ranked higher than the negative segment, $s^-$, by at least a certain margin, the penalty is zero, and if not, the penalty imposed by the loss function in Expression (3) is nonzero; and the nonzero penalty is a quadratically-determined one for small-margin violations (where u is not more than $\delta$) and a linearly-determined one for stronger (or larger) violations (where u exceeds $\delta$).

The value of $\delta$ may vary based on a determined quality of the GIF, which may be determined based on the GIF's popularity. As discussed herein, the quality one GIF may differ from that of another GIF. Examples of factors that can impact a GIF's quality include the user's experience creating a GIF and/or the quality of the video from which the GIF is generated. Some GIFs might be created using a user's casual selection of one or more segments from a mediocre-quality video and others might be created from the segment(s) carefully selected by a user from a high-quality video. Thus, some GIFs can be considered more reliable as positive examples than others. The value of $\delta$ can be made GIF dependent, such that a higher $\delta$ can be assigned to more popular GIFs, where popularity provides a measure of quality of a GIF. A GIF's popularity may be determined based on the number of views, likes, reblogs, etc. More popular GIFs are less likely to be outliers and therefore it is not necessary to use an early linear loss, and a higher $\delta$ can be used in such a case.

Therefore, Part 3 of Step 206 as discussed above involves the shot evaluation module 304 applying a regression function to the fusion feature vector X and a weighted (optimal) parameter W, and returning a real valued output score y: F(X,W)=y.

In summary of Parts 1-3 of Step 206, the shot evaluation module 104 analyzes each shot in order to extract contextual and visual content features (Part 1). The extracted features are compiled into a fusion feature vector (Part 2). Then, a ranking function is applied to the fusion feature vector in order to determine a suitability score for each segment (Part 3). Thus Step 206 results in an evaluation of the shots (or GIF candidates) of a video file that provides an indication of the suitability scores for each shot (or GIF candidate).

In Step 208, the shot selection module 306 selects a predetermined number of top scoring (or ranking) shots for animated GIF generation. In some embodiments, the number of shots selected can be set by a user, the system, device or network capabilities for rendering a GIF, an application, an administrator, and the like, or some combination thereof. In some embodiments, if the GIF engine 100 is requested to generate a specific number of GIFs from a video file (e.g., by a request from a user), then only the top scoring shots corresponding to that specific number are selected (e.g., if a single GIF is requested, then the shot with the highest score is selected). In some embodiments, the number of shots selected can be set by a user, the system, device or network capabilities for rendering a GIF, an application, an administrator, and the like, or some combination thereof. In some embodiments, the number of top scoring shots must satisfy a suitability threshold, in that only shots with suitability scores at or above the suitability threshold are eligible for selection. In some embodiments, if the GIF engine 100 is requested to generate a specific number of GIFs from a video file (e.g., by a request from a user), then only the top scoring shots corresponding to that specific number are selected (e.g., if a single GIF is requested, then the shot with the highest score is selected). In some embodiments, the selection of shot can be performed by a user, where multiple shots are presented to a user, and the user can select the shot(s) he or she desires to convert into an animated GIF.

In some embodiments, when multiple GIFs are requested, in order to ensure that the resulting animated GIFs are non-redundant, the shot selection module 306 can perform any known or to be known clustering analysis, where the number of clusters set is the number of animated GIFs to be generated (or requested), and the only one animated GIF per cluster can be selected.

In Step 210, the generation module 108 transforms the selected shot(s) (or selected GIF candidate(s)) into an animated GIF. That is, the animated GIF is created from the selected shot(s). Thus, the selected shot(s) with the highest score(s) is converted into an animated GIF. The generation module 308 can create the animated GIF using any known or to be known shot/segment transformation technique, such as, but not limited to, imagemagick and gifsicle libraries, to name a few examples.

In Step 212, the generated animated GIF(s) is communicated to a user for display on the user's device. In some embodiments, such communication can involve automatically rendering the GIF upon display on the user's device, and in some embodiments, such communication can involve a user sharing the GIF with another user. In some embodiments, sharing of the GIF with an identified set of users can be performed automatically upon generation of the GIF, where not only does the requesting user receive the GIF, but also other users who follow the user, or have been identified by the user, can be provided the generated GIF (e.g., reblogging the GIF to a user's followers pages on Tumblr®). As will be understood by those of skill in the art, sharing GIFs extracted from videos in this manner could result in improved user engagement in video content from which the GIF was created and/or the generated GIFs, as well as increased activity by users on a social networking site that hosts and/or creates such GIFs.

According to some embodiments of the present disclosure, information associated with a extracted/created GIF, as discussed above in relation to Process 200, can be fed back to the GIF engine 100 for modeling (or training) of the information stored in database 120 via iterative or recursive bootstrapping or aggregation functionality. This can improve the accuracy of suitability scores for GIF candidates (i.e. shots), as discussed above. Embodiments of the present disclosure involve the recommendation engine 100 applying such recursive/bootstrapping functions utilizing any known or to be known open source and/or commercial software machine learning algorithm, technique or technology.

Since animated GIFs can be generated without human effort as described herein, such animated GIFs can be precomputed using any existing videos in a fully automated fashion and stored along with the existing videos in one or more database servers. Users can be given access to the generated animated GIFs stored on the database server(s) so that the users can share any video by selecting one of the animated GIF's precomputed for the video. Since an animated GIF is more engaging than a static image, sharing videos in this way increases user engagement and increases the number of active users engaged.

According to some embodiments, the suitability score associated with one or more segments of an animated GIF can be used as a measure of quality of the animated GIF. The quality measure can be used in search and recommendation of animated GIFs. Search tools such as those used by Tumblr® and Yahoo Mail allow a user to search animated GIFs using keyword query terms. The search results are ranked by a popularity metric based on the number of likes and reblogs. Such ranking does not consider the quality of an animated GIF. As such, high quality GIFs that are not yet popular are excluded in the top search results. Ranking is improved when it considers quality of animated GIFs, where such quality can be determined using the suitability score determined as described herein. The measure of quality can be the suitability score for a given segment included in an animated GIF, or it can be a combination of the suitability scores of multiple segments used to generate an animated GIF. Such a combination may be an average of the multiple segments' suitability scores, for example.

Figure 4:
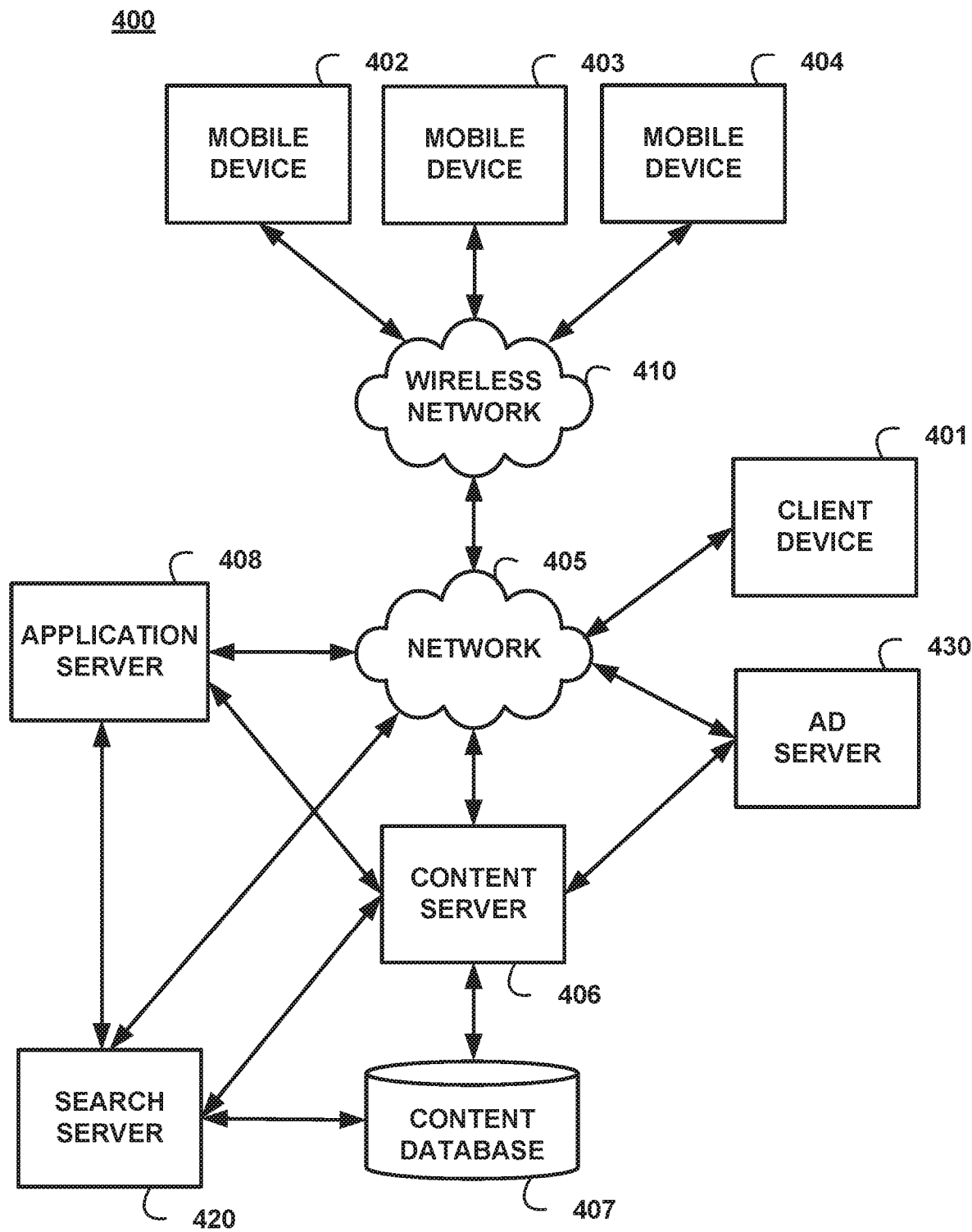
FIG. 4 is a schematic diagram illustrating an example of a network within which the systems and methods disclosed herein could be implemented according to some embodiments of the present disclosure.

The following describes components of a general architecture used within the disclosed system and methods, the operation of which with respect to the disclosed system and methods being described herein. In general, with reference to FIG. 4, a system 400 in accordance with an embodiment of the present disclosure is shown. FIG. 4 shows components of a general environment in which the systems and methods discussed herein may be practiced. Not all the components may be required to practice the disclosure, and variations in the arrangement and type of the components may be made without departing from the spirit or scope of the disclosure. As shown, system 400 of FIG. 4 includes local area networks ("LANs")/wide area networks ("WANs")—network 405, wireless network 410, mobile devices (client devices) 402-404 and client device 401. FIG. 4 additionally includes a variety of servers, such as content server 406, application (or "App") server 408, search server 420 and advertising ("ad") server 430.

One embodiment of mobile devices 402-404 is described in more detail below. Generally, however, mobile devices 402-404 may include virtually any portable computing device capable of receiving and sending a message over a network, such as network 405, wireless network 410, or the like. Mobile devices 402-404 may also be described generally as client devices that are configured to be portable. Thus, mobile devices 402-404 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 402-404 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 402-404 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 402-404 may uniquely identify themselves through any of a variety of mechanisms, including a phone number, Mobile Identification Number (MIN), an electronic serial number (ESN), or other mobile device identifier.

In some embodiments, mobile devices 402-404 may also communicate with non-mobile client devices, such as client device 401, or the like. In one embodiment, such communications may include sending and/or receiving messages, searching for, viewing and/or sharing photographs, audio clips, video clips, or any of a variety of other forms of communications. Client device 401 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 41 may also have differing capabilities for displaying navigable views of information.

Client devices 401-404 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 410 is configured to couple mobile devices 402-404 and its components with network 405. Wireless network 410 may include any of a variety of wireless sub-networks that may further overlay stand-alone ad-hoc networks, and the like, to provide an infrastructure-oriented connection for mobile devices 402-404. Such sub-networks may include mesh networks, Wireless LAN (WLAN) networks, cellular networks, and the like.

Network 405 is configured to couple content server 406, application server 408, or the like, with other computing devices, including, client device 401, and through wireless network 410 to mobile devices 402-404. Network 405 is enabled to employ any form of computer readable media for communicating information from one electronic device to another. Also, network 405 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 410 and/or 405 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 406 may include a device that includes a configuration to provide content via a network to another device. A content server 406 may, for example, host a site or service, such as streaming media site/service (e.g., YouTube®), an email platform or social networking site, or a personal user site (such as a blog, vlog, online dating site, and the like). A content server 406 may also host a variety of other sites, including, but not limited to business sites, educational sites, dictionary sites, encyclopedia sites, wikis, financial sites, government sites, and the like. Devices that may operate as content server 406 include personal computers desktop computers, multiprocessor systems, microprocessor-based or programmable consumer electronics, network PCs, servers, and the like.

Content server 406 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 408, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 430 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 406, 408, 420 and 430 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 406, 408, 420 and/or 430. This may include in a non-limiting example, authentication servers, search servers, email servers, social networking services servers, SMS servers, IM servers, MMS servers, exchange servers, photo-sharing services servers, and travel services servers, via the network 405 using their various devices 401-404. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 408 (or content server 406, search server 420 and the like). Thus, the application server 408 can store various types of applications and application related information including application data and user profile information (e.g., identifying and behavioral information associated with a user). It should also be understood that content server 406 can also store various types of data related to the content and services provided by content server 406 in an associated content database 407, as discussed in more detail below. Embodiments exist where the network 405 is also coupled with/connected to a Trusted Search Server (TSS) which can be utilized to render content in accordance with the embodiments discussed herein. Embodiments exist where the TSS functionality can be embodied within servers 46, 48, 420 and/or 430.

Moreover, although FIG. 4 illustrates servers 406, 408, 420 and 430 as single computing devices, respectively, the disclosure is not so limited. For example, one or more functions of servers 406, 408, 420 and/or 430 may be distributed across one or more distinct computing devices. Moreover, in one embodiment, servers 406, 408, 420 and/or 430 may be integrated into a single computing device, without departing from the scope of the present disclosure.

Figure 5:
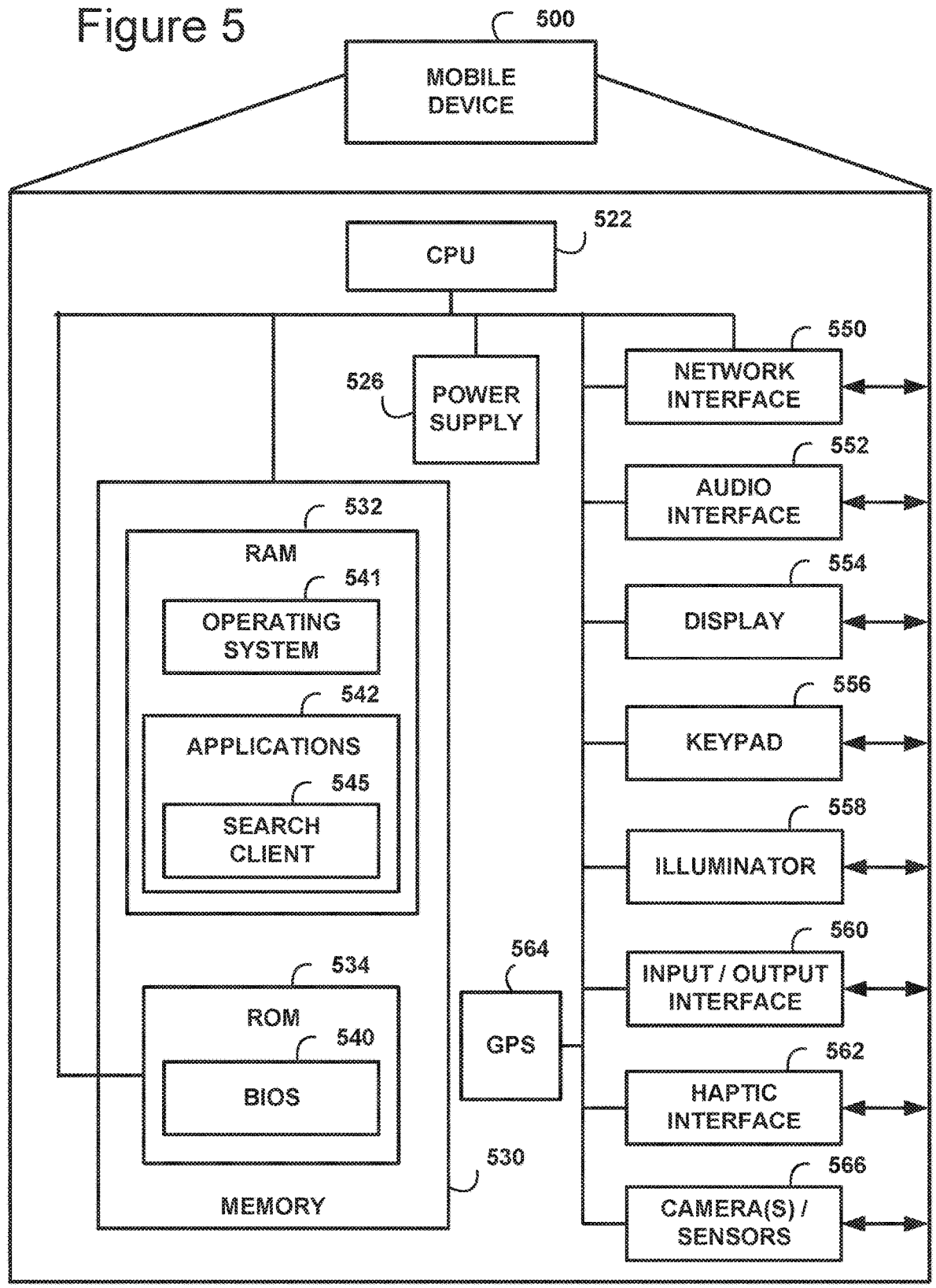
FIG. 5 depicts is a schematic diagram illustrating an example of client device in accordance with some embodiments of the present disclosure.

FIG. 5 is a schematic diagram illustrating a client device showing an example embodiment of a client device that may be used within the present disclosure. Client device 500 may include many more or less components than those shown in FIG. 5. However, the components shown are sufficient to disclose an illustrative embodiment for implementing the present disclosure. Client device 500 may represent, for example, client devices discussed above in relation to FIG. 4.

As shown in the figure, client device 500 includes a processing unit (CPU) 522 in communication with a mass memory 530 via a bus 524. Client device 500 also includes a power supply 526, one or more network interfaces 550, an audio interface 552, a display 554, a keypad 556, an illuminator 558, an input/output interface 560, a haptic interface 562, an optional global positioning systems (GPS) receiver 564 and a camera(s) or other optical, thermal or electromagnetic sensors 566. Device 500 can include one camera/sensor 566, or a plurality of cameras/sensors 566, as understood by those of skill in the art. The positioning of the camera(s)/sensor(s) 566 on device 500 can change per device 500 model, per device 500 capabilities, and the like, or some combination thereof.

Power supply 526 provides power to client device 500. A rechargeable or non-rechargeable battery may be used to provide power. The power may also be provided by an external power source, such as an AC adapter or a powered docking cradle that supplements and/or recharges a battery.

Client device 500 may optionally communicate with a base station (not shown), or directly with another computing device. Network interface 250 includes circuitry for coupling Client device 500 to one or more networks, and is constructed for use with one or more communication protocols and technologies as discussed above. Network interface 550 is sometimes known as a transceiver, transceiving device, or network interface card (NIC).

Audio interface 552 is arranged to produce and receive audio signals such as the sound of a human voice. For example, audio interface 552 may be coupled to a speaker and microphone (not shown) to enable telecommunication with others and/or generate an audio acknowledgement for some action. Display 554 may be a liquid crystal display (LCD), gas plasma, light emitting diode (LED), or any other type of display used with a computing device. Display 554 may also include a touch sensitive screen arranged to receive input from an object such as a stylus or a digit from a human hand.

Keypad 556 may comprise any input device arranged to receive input from a user. For example, keypad 556 may include a push button numeric dial, or a keyboard. Keypad 556 may also include command buttons that are associated with selecting and sending images. Illuminator 558 may provide a status indication and/or provide light. Illuminator 558 may remain active for specific periods of time or in response to events. For example, when illuminator 558 is active, it may backlight the buttons on keypad 556 and stay on while the client device is powered. Also, illuminator 558 may backlight these buttons in various patterns when particular actions are performed, such as dialing another client device. Illuminator 558 may also cause light sources positioned within a transparent or translucent case of the client device to illuminate in response to actions.

Client device 500 also comprises input/output interface 560 for communicating with external devices, such as a headset, or other input or output devices not shown in FIG. 5. Input/output interface 560 can utilize one or more communication technologies, such as USB, infrared, Bluetooth™, or the like. Haptic interface 562 is arranged to provide tactile feedback to a user of the client device. For example, the haptic interface may be employed to vibrate client device 500 in a particular way when the client device 200 receives a communication from another user.

Optional GPS transceiver 564 can determine the physical coordinates of client device 500 on the surface of the Earth, which typically outputs a location as latitude and longitude values. GPS transceiver 564 can also employ other geo-positioning mechanisms, including, but not limited to, triangulation, assisted GPS (AGPS), E-OTD, CI, SAI, ETA, BSS or the like, to further determine the physical location of client device 500 on the surface of the Earth. It is understood that under different conditions, GPS transceiver 564 can determine a physical location within millimeters for client device 500; and in other cases, the determined physical location may be less precise, such as within a meter or significantly greater distances. In one embodiment, however, client device 500 may through other components, provide other information that may be employed to determine a physical location of the device, including for example, a MAC address, Internet Protocol (IP) address, or the like.

Mass memory 530 includes a RAM 532, a ROM 534, and other storage means. Mass memory 530 illustrates another example of computer storage media for storage of information such as computer readable instructions, data structures, program modules or other data. Mass memory 530 stores a basic input/output system ("BIOS") 540 for controlling low-level operation of client device 500. The mass memory also stores an operating system 541 for controlling the operation of client device 500. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 530 further includes one or more data stores, which can be utilized by client device 500 to store, among other things, applications 542 and/or other data. For example, data stores may be employed to store information that describes various capabilities of client device 500. The information may then be provided to another device based on any of a variety of events, including being sent as part of a header during a communication, sent upon request, or the like. At least a portion of the capability information may also be stored on a disk drive or other storage medium (not shown) within client device 500.

Applications 542 may include computer executable instructions which, when executed by client device 500, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 542 may further include search client 545 that is configured to send, to receive, and/or to otherwise process a search query and/or search result using any known or to be known communication protocols. Although a single search client 545 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 6:
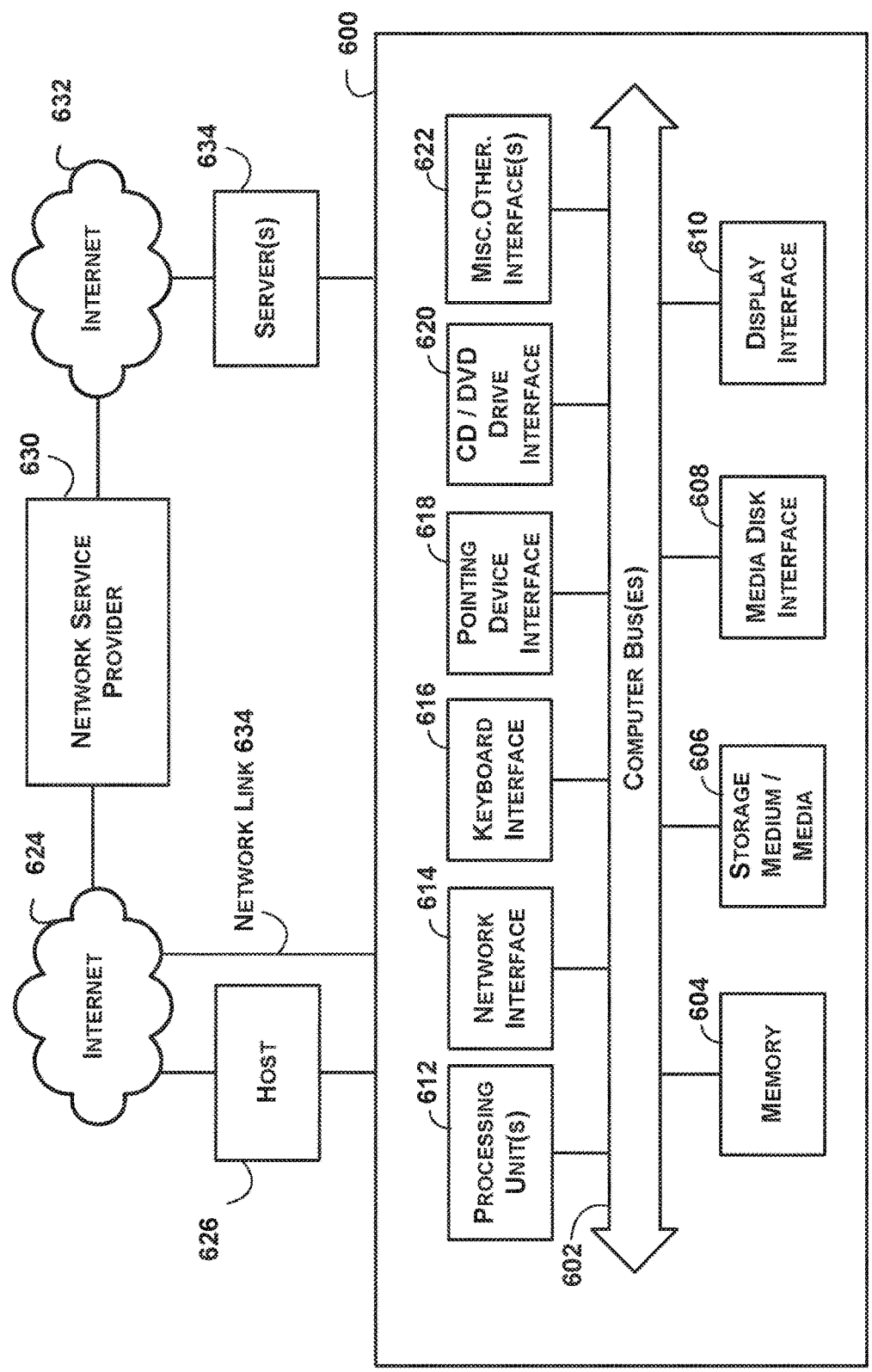
FIG. 6 is a block diagram illustrating the architecture of an exemplary hardware device in accordance with one or more embodiments of the present disclosure.

As shown in FIG. 6, internal architecture 600 of a computing device(s), computing system, computing platform, user devices, set-top box, smart TV and the like includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), media disk drive interface 620 as an interface for a drive that can read and/or write to media including removable media such as floppy, CD-ROM, DVD, media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces and a universal serial bus (USB) interface.

Memory 604 interfaces with computer bus 602 so as to provide information stored in memory 604 to CPU 612 during execution of software programs such as an operating system, application programs, device drivers, and software modules that comprise program code, and/or computer executable process steps, incorporating functionality described herein, e.g., one or more of process flows described herein. CPU 612 first loads computer executable process steps from storage, e.g., memory 604, computer readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 628 typically provides information communication using transmission media through one or more networks to other devices that use or process the information. For example, network link 628 may provide a connection through local network 624 to a host computer 626 or to equipment operated by a Network or Internet Service Provider (ISP) 630. ISP equipment in turn provides data communication services through the public, worldwide packet-switching communication network of networks now commonly referred to as the Internet 632.

A computer called a server host 634 connected to the Internet 632 hosts a process that provides a service in response to information received over the Internet 632. For example, server host 634 hosts a process that provides information representing video data for presentation at display 610. It is contemplated that the components of system 600 can be deployed in various configurations within other computer systems, e.g., host and server.

At least some embodiments of the present disclosure are related to the use of computer system 600 for implementing some or all of the techniques described herein. According to one embodiment, those techniques are performed by computer system 600 in response to processing unit 612 executing one or more sequences of one or more processor instructions contained in memory 604. Such instructions, also called computer instructions, software and program code, may be read into memory 604 from another computer-readable medium 606 such as storage device or network link. Execution of the sequences of instructions contained in memory 604 causes processing unit 612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 600. Computer system 600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
    determining, by a computing device, an n-dimensional feature vector for each segment of a plurality of segments of a video file, the feature vector determination for the segment of the plurality comprising parsing the segment to identify information associated with context and content features of the segment, the feature vector being based on the context and content information;
    determining, by the computing device, a Graphics Interchange Format (GIF) suitability score for each segment of the plurality, the GIF suitability score determination for the segment of the plurality being based on the segment's feature vector, the segment's GIF suitability score being a measure of the segment's suitability for inclusion in an animated GIF file;
    automatically selecting, by the computing device, a number of segments of the plurality, each selected segment's GIF suitability score indicating that the selected segment is more suitable for inclusion in the animated GIF file than each unselected segment's GIF suitability score;
    communicating, by the computing device, information identifying the number of segments, of the plurality of segments of the video file, to a client computing device of a user for display via a graphical user interface at the client computing device;
    receiving, by the computing device from the client computing device, input indicative of a set of segments selected, by the user, from the number of segments for creation of an animated GIF file; and
    automatically creating, by the computing device, the animated GIF file using the set of segments selected by the user.

2. The method of claim 1, further comprising:
    determining, by the computing device, the plurality of segments within the video file, the segment determination comprising parsing the video file to identify transition frames within the video file, each segment of the plurality comprising video frames of the video file existing between a pair of identified transition frames.

3. The method of claim 2, determination of the plurality of segments within the video file further comprising:
    identifying a segment of the plurality that is longer than a predetermined threshold segment length; and
    identifying a number of transitions in the identified segment using a multiple change point detection (MCPD) algorithm.

4. The method of claim 1, further comprising:
    receiving, at the computing device and via the graphical user interface, a request from a user for creation of the animated GIF file from a video file, communication of the information identifying the number of segments being performed in response to receiving the request from the user.

5. The method of claim 1, further comprising:
    communicating, via the computing device, the animated GIF file to the client computing device of the user for display at the client computing device.

6. The method of claim 1, the computing device and the client computing device are the same device.

7. The method of claim 1, the computing device is a server computing device, of a recommendation system, in communication with the client computing device.

8. The method of claim 1, further comprising:
    receiving, by the computing device, a request, from the client computing device, to search a plurality of animated GIF files, each animated GIF file having a quality measure determined using the GIF suitability score of at least one segment included in the animated GIF file, the request comprising a number of search terms;
    generating, by the computing device and using the number of search terms from the request and the quality measure of at least one animated GIF file considered in generating the search results, the search results comprising a number of animated GIF files of the plurality; and
    providing, by the computing device, the search results comprising the number of animated GIF files to the client computing device.

9. The method of claim 8, the quality measure of an animated GIF file of the plurality being determined using the GIF suitability score of one segment of the animated GIF file.

10. The method of claim 8, the quality measure of an animated GIF file of the plurality being a combination of the GIF suitability score of each segment of the animated GIF file.

11. The method of claim 8, the quality measure of an animated GIF file of the plurality being an average GIF suitability score determined using the GIF suitability score of each segment of the animated GIF file.

12. The method of claim 8, the quality measure of an animated GIF file of the plurality being used in ranking at least some of the number of animated GIF files in the search results.

13. The method of claim 12, a popularity score associated with at least one animated GIF file of the number of animated GIF files in the search results being used in ranking the number of animated GIF files in the search results.

14. The method of claim 13, the popularity score of the at least one animated GIF file of the number being determined using information comprising at least one of a number of likes and a number of reblogs.

15. A non-transitory computer-readable storage medium tangibly encoded with computer-executable instructions that when executed by a processor associated with a computing device perform a method comprising:
   determining an n-dimensional feature vector for each segment of a plurality of segments of a video file, the feature vector determination for the segment of the plurality comprising parsing the segment to identify information associated with context and content features of the segment, the feature vector being based on the context and content information;
   determining a Graphics Interchange Format (GIF) suitability score for each segment of the plurality, the GIF suitability score determination for the segment of the plurality being based on the segment's feature vector, the segment's GIF suitability score being a measure of the segment's suitability for inclusion in an animated GIF file;
   automatically selecting a number of segments of the plurality, each selected segment's GIF suitability score indicating that the selected segment is more suitable for inclusion in the animated GIF file than each unselected segment's GIF suitability score;
   communicating information identifying the number of segments, of the plurality of segments of the video file, to a client computing device of a user for display via a graphical user interface at the client computing device;
   receiving, from the client computing device, input indicative of a set of segments selected, by the user, from the number of segments for creation of an animated GIF file; and
   automatically creating the animated GIF file using the set of segments selected by the user.

16. A computing device comprising:
   a processor;
   a non-transitory storage medium for tangibly storing thereon program logic for execution by the processor, the program logic comprising:
      determining logic executed by the processor for determining an n-dimensional feature vector for each segment of a plurality of segments of a video file, the feature vector determination for the segment of the plurality comprising parsing the segment to identify information associated with context and content features of the segment, the feature vector being based on the context and content information;
      determining logic executed by the processor for determining a Graphics Interchange Format (GIF) suitability score for each segment of the plurality, the GIF suitability score determination for the segment of the plurality being based on the segment's feature vector, the segment's GIF suitability score being a measure of the segment's suitability for inclusion in an animated GIF file;
      selecting logic executed by the processor for automatically selecting a number of segments of the plurality, each selected segment's GIF suitability score indicating that the selected segment is more suitable for inclusion in the animated GIF file than each unselected segment's GIF suitability score;
      communicating logic executed by the processor for communicating information identifying the number of segments, of the plurality of segments of the video file, to a client computing device of a user for display via a graphical user interface at the client computing device;
      receiving logic executed by the processor for receiving, from the client computing device, input indicative of a set of segments selected, by the user, from the number of segments for creation of an animated GIF file; and
      creating logic executed by the processor for automatically creating the animated GIF file using the set of segments selected by the user.

17. A method comprising:
   for each animated Graphics Interchange Format (GIF) file of a plurality of animated GIF files:
      determining, by a computing device, an n-dimensional feature vector for each segment of a plurality of segments of a video file, the feature vector determination for the segment of the plurality comprising parsing the segment to identify information associated with context and content features of the segment, the feature vector being based on the context and content information;
      determining, by the computing device, a Graphics Interchange Format (GIF) suitability score for each segment of the plurality, the GIF suitability score determination for the segment of the plurality being based on the segment's feature vector, the segment's GIF suitability score being a measure of the segment's suitability for inclusion in an animated GIF file;
      automatically selecting, by the computing device, a number of segments of the plurality, each selected segment's GIF suitability score indicating that the selected segment is more suitable for inclusion in the animated GIF file than each unselected segment's GIF suitability score;
      automatically creating, by the computing device, the animated GIF file using a set of segments of the number of automatically selected segments;
      storing, by the computing device, the animated GIF and an associated quality measure determined using the GIF suitability score of at least one of the segments from the set of segments used to create the animated GIF file,
   receiving, by the computing device, a request, from a client computing device, to search the plurality of animated GIF files, each animated GIF file having a quality measure determined using the GIF suitability score of at least one segment included in the animated GIF file, the request comprising a number of search terms;

generating, by the computing device and using the number of search terms from the request and the quality measure of at least one animated GIF file considered in generating the search results, the search results comprising a number of animated GIF files of the plurality; and providing, by the computing device, the search results comprising the number of animated GIF files to the client computing device.

18. The method of claim 17, automatic creation of an animated GIF file of the plurality further comprising:

communicating, by the computing device, information identifying the number of segments, of the plurality of segments of the video file, to a client computing device of a user for display via a graphical user interface at the client computing device;

receiving, by the computing device from the client computing device, input indicative of the set of segments selected, by the user, from the number of segments for creation of an animated GIF file; and automatically creating, by the computing device, the animated GIF file using the set of segments selected by the user.

19. The method of claim 17, automatic creation of an animated GIF file of the plurality further comprising automatically creating the animated GIF file using each of the segments from the number of automatically selected segments.

20. The method of claim 17, the quality measure of the at least one animated GIF file of the plurality being used in ranking the at least one animated GIF file in the search results.

* * * * *